United States Patent
Al-Dahhan

(10) Patent No.: US 10,274,036 B2
(45) Date of Patent: Apr. 30, 2019

(54) ENERGY MANAGEMENT JOUNCE BUMPER ASSEMBLY

(71) Applicant: BASF SE, Ludwigshafen (DE)

(72) Inventor: Sadiq Al-Dahhan, Dearborn, MI (US)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 15/358,275

(22) Filed: Nov. 22, 2016

(65) Prior Publication Data
US 2017/0144504 A1 May 25, 2017

Related U.S. Application Data

(60) Provisional application No. 62/259,149, filed on Nov. 24, 2015.

(51) Int. Cl.
| | | |
|---|---|---|
| *F16F 1/376* | (2006.01) | |
| *F16F 1/377* | (2006.01) | |
| *F16F 1/37* | (2006.01) | |
| *F16F 1/36* | (2006.01) | |
| *B60G 11/22* | (2006.01) | |

(52) U.S. Cl.
CPC .............. *F16F 1/377* (2013.01); *B60G 11/22* (2013.01); *F16F 1/3605* (2013.01); *F16F 1/37* (2013.01); *F16F 1/376* (2013.01); *B60G 2202/143* (2013.01); *B60G 2204/4502* (2013.01); *F16F 2224/025* (2013.01); *F16F 2224/0225* (2013.01)

(58) Field of Classification Search
CPC .......... F16F 1/3605; F16F 1/376; F16F 1/377; F16F 2224/0225; F16F 2224/025; F16F 9/58; B60G 11/22; B60G 2202/143; B60G 2204/4502

USPC .............................. 267/140.3, 220, 292, 294
See application file for complete search history.

(56) References Cited

U.S. PATENT DOCUMENTS

| | | | | |
|---|---|---|---|---|
| 2,747,166 A | | 5/1956 | Hoffarth | |
| 4,002,315 A | * | 1/1977 | Van Goubergen | F16F 1/376 248/633 |
| 4,771,996 A | | 9/1988 | Martinez, Jr. et al. | |
| 5,257,730 A | * | 11/1993 | Nakaura | F16F 3/093 267/140.3 |
| 5,467,970 A | * | 11/1995 | Ratu | B60G 7/04 267/152 |

(Continued)

FOREIGN PATENT DOCUMENTS

EP 0538529 A1 * 4/1993 ............ F16C 25/083

*Primary Examiner* — Thomas W Irvin
(74) *Attorney, Agent, or Firm* — DLA Piper LLP (US)

(57) ABSTRACT

An energy management jounce bumper assembly absorbs energy between a first component and a second component of a vehicle. The energy management jounce bumper assembly includes a bumper axially compressible between the first and second components. A plate is connected to the bumper. The plate has a body portion having a first surface and a second surface opposite the first surface. A first plurality of ribs is disposed on the first surface and a second plurality of ribs is disposed on the second surface. The body portion of the plate has a standard position wherein the body portion is either one of planar and non-planar and has a first height. The plate is adaptable between the standard position and a compressed position wherein the body portion is either one of non-planar and planar, respectively, and has a second height that is less than the first height.

21 Claims, 9 Drawing Sheets

(56) References Cited

U.S. PATENT DOCUMENTS

| | | | | |
|---|---|---|---|---|
| 5,470,049 A * | 11/1995 | Wohler | ................... | B60G 11/16 267/170 |
| 5,788,262 A * | 8/1998 | Dazy | .................... | B60G 15/063 188/321.11 |
| 6,079,700 A * | 6/2000 | Solomond | ............ | B60G 15/063 267/221 |
| 6,149,171 A * | 11/2000 | Bono | .................... | B60G 11/16 280/124.179 |
| 6,186,486 B1 | 2/2001 | Gutman et al. | | |
| 6,398,201 B1 * | 6/2002 | Solomond | ............ | B60G 15/063 267/170 |
| 6,457,704 B1 * | 10/2002 | Van Eerden | ........... | B60G 11/52 267/166 |
| 6,592,112 B2 | 7/2003 | Bishop et al. | | |
| 6,733,023 B2 * | 5/2004 | Remmert | ............... | B60G 11/16 267/179 |
| 6,908,076 B2 * | 6/2005 | Hayashi | ............... | B60G 13/003 267/153 |
| 7,044,061 B2 * | 5/2006 | O'Donnell | ............. | B61F 5/142 105/199.3 |
| 7,048,265 B2 | 5/2006 | Huprikar | | |
| 7,172,182 B2 | 2/2007 | Huprikar et al. | | |
| 7,178,795 B2 | 2/2007 | Huprikar et al. | | |
| 7,347,414 B2 | 3/2008 | Groves | | |
| 7,416,175 B2 * | 8/2008 | Al-Dahhan | ............ | B60G 11/15 267/140 |
| 7,503,552 B2 | 3/2009 | Huprikar et al. | | |
| 7,703,755 B2 * | 4/2010 | Schleck | .................... | F16F 9/58 267/140.3 |
| 7,793,922 B2 * | 9/2010 | Hikosaka | ................. | B60G 7/04 267/136 |
| 8,109,491 B2 | 2/2012 | Handke et al. | | |
| 8,123,203 B2 | 2/2012 | Patil et al. | | |
| 8,167,283 B2 | 5/2012 | Huprikar et al. | | |
| 8,317,169 B1 * | 11/2012 | Cantolino | ............... | F24H 9/165 248/188.8 |
| 8,333,269 B2 | 12/2012 | Dickson et al. | | |
| 8,459,621 B2 * | 6/2013 | Cook | ........................ | B32B 7/12 267/179 |
| 9,193,238 B2 * | 11/2015 | Al-Dahhan | ............ | B60G 11/22 |
| 9,802,454 B2 * | 10/2017 | Wilkin | ...................... | F16F 1/12 |
| 2006/0043659 A1 * | 3/2006 | Gofron | ................... | B60G 7/04 267/220 |
| 2009/0057970 A1 * | 3/2009 | Leonard | ................... | B60G 7/04 267/220 |
| 2010/0127437 A1 * | 5/2010 | Stevens | ..................... | F16F 9/38 267/64.11 |
| 2012/0292842 A1 * | 11/2012 | Van Der Zyppe | ........ | F16F 9/58 267/292 |
| 2013/0328255 A1 | 12/2013 | Geisler et al. | | |
| 2018/0187741 A1 * | 7/2018 | Kelly | ..................... | F16F 13/10 |

\* cited by examiner

ENERGY MANAGEMENT JOUNCE BUMPER ASSEMBLY

CROSS-REFERENCE TO RELATED APPLICATION(S)

This application claims priority to and all the advantages of U.S. Provisional Patent Application No. 62/259,149, filed on Nov. 24, 2015, the contents of which is incorporated herein by reference in its entirety.

BACKGROUND OF THE INVENTION

1. Field of the Invention

The present invention relates generally to suspension systems for vehicles and, more particularly to, an energy management jounce bumper assembly for use with a suspension system of a vehicle.

2. Description of the Related Art

Suspension systems for vehicles typically use jounce bumpers to limit transmission of an impact force from tires to a frame member of the vehicle. For example, when the vehicle travels over a bump, components of the suspension system, such as a strut assembly, jounce or collapse to absorb energy generated by the impact. However, when the suspension system cannot completely dissipate the energy, the components of the suspension system may be damaged by the non-dissipated energy. For example, extra energy not absorbed can cause catastrophic failures to components of the suspension system such as shock tubes, shock towers, and/or shock mounts. Additionally, the impact force may be transferred to the frame member, which is not desirable. Therefore, there is a need in the art to increase the energy absorbing capabilities of the suspension system while meeting the size requirements of the vehicle manufacturer.

SUMMARY OF THE INVENTION

An energy management jounce bumper assembly can absorb energy between a first component and a second component of a suspension system of a vehicle. The energy management jounce bumper assembly includes a bumper having a first end adapted to be configured to be coupled to the first component. The bumper also has a second end spaced from the first end with the second end adapted to be configured to contact the second component. The bumper is configured to be axially compressible along a jounce axis between the first and second components. The energy management jounce bumper assembly also includes a plate connected to the bumper. The plate has a body portion having a first surface configured to face the first component and a second surface opposite the first surface to face the second component. The plate includes a first plurality of ribs disposed on the first surface and a second plurality of ribs disposed on the second surface. The body portion of the plate has a standard position wherein the body portion is either one of a planar shape and non-planar shape and has a first height defined between ends of the first plurality of ribs and the second plurality of ribs. The plate is adaptable between the standard position and a compressed position wherein the body portion is either one of non-planar and planar, respectively, and has a second height defined between the ends of the first plurality of ribs and the second plurality of ribs wherein the second height is less than the first height.

One advantage of the present invention is that the compression of the plate from the standard position to the compressed position absorbs additional energy not absorbed by the bumper alone thereby increasing the energy absorbing capabilities of the energy management jounce bumper assembly without altering the relative size of the bumper.

Other advantages of the present invention will be readily appreciated, as the same becomes better understood by reference to the following detailed description when considered in connection with the accompanying drawings.

DETAILED DESCRIPTION OF THE INVENTION

Figure 1:
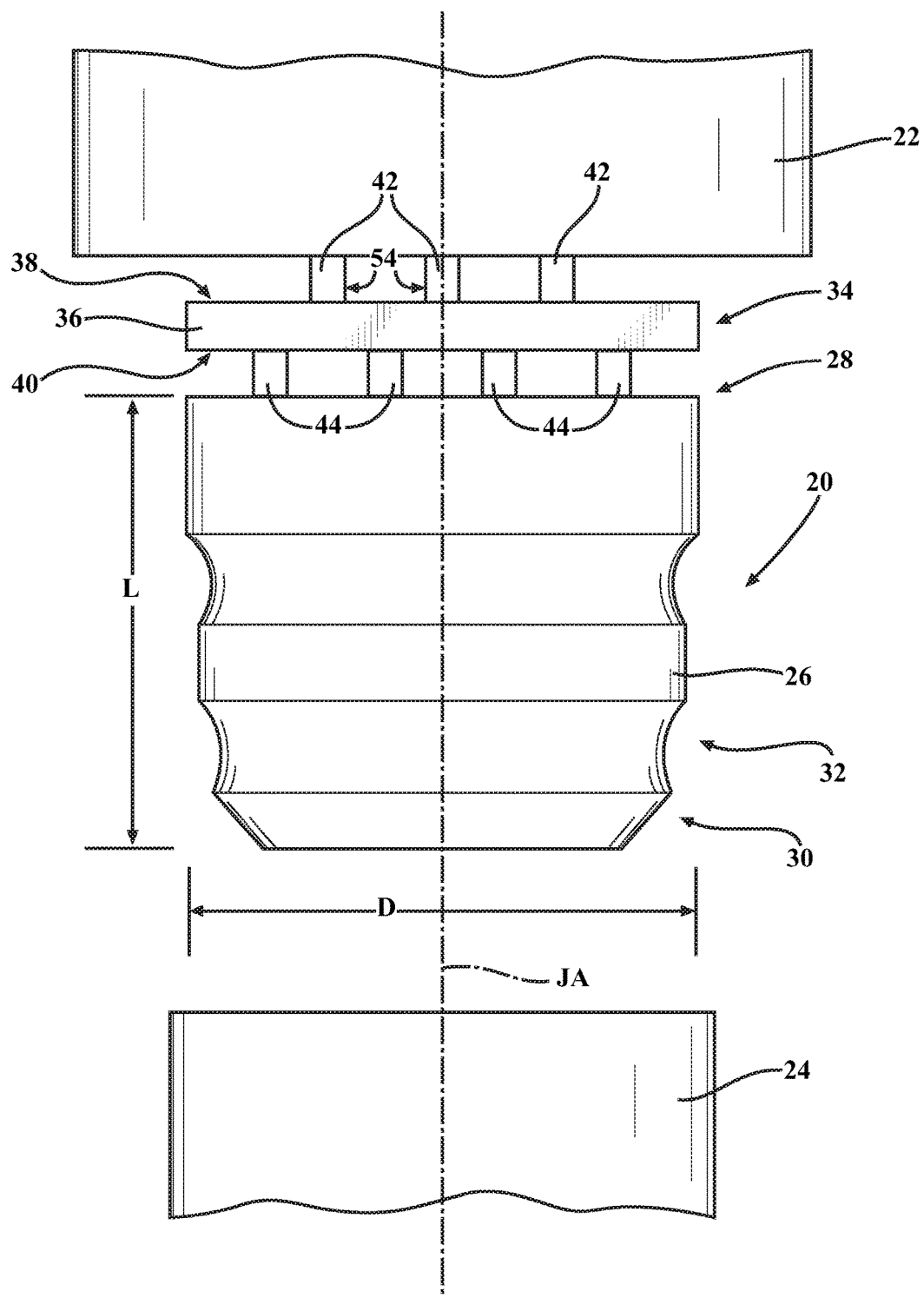
FIG. 1 is a front view of an energy management jounce bumper assembly, according to the present invention, disposed between a first component and a second component.
Figure 2:
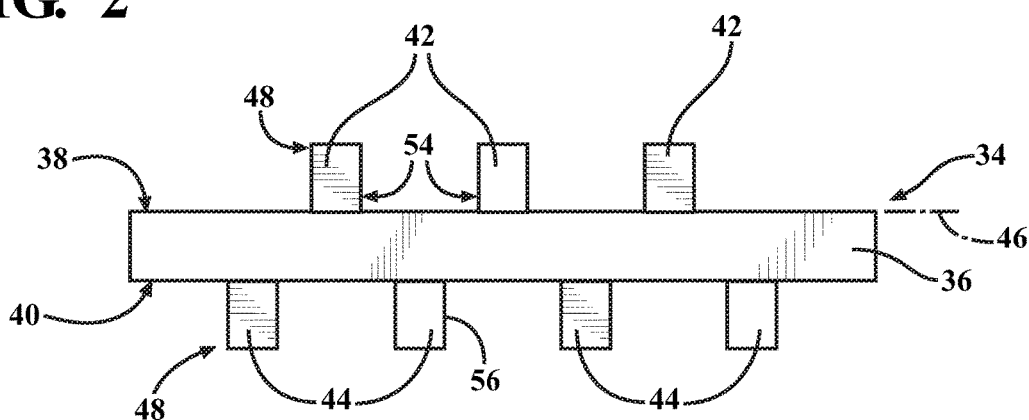
FIG. 2 is a front view of one embodiment of a plate, according to the present invention, used in the energy management jounce bumper assembly of FIG. 1.

With reference to the Figures, wherein like numerals indicate like parts throughout the several views, one embodiment of an energy management jounce bumper assembly, according to the present invention, is generally shown at 20. Generally, the energy management jounce bumper assembly 20 limits jounce travel between a first component 22 and a second component 24 of a suspension system of a vehicle. For example, the energy management jounce bumper assembly 20 is compressed between the first and second components 22, 24, or between other components connected to the first and second components 22, 24. It should be appreciated that the energy management jounce bumper assembly 20 is adapted to absorb energy from the first component 22 and/or the second component 24.

Generally, the second component 24 is spaced from the first component 22. At least one of the first and second components 22, 24 is moveable towards the other one of the first and second components 22, 24 along a jounce axis JA. It should be appreciated that the first component 22 may be movable towards the second component 24, the second component 24 may be moveable towards the first component 22, and the first and second components 22, 24 may be moveable toward each other.

The energy management jounce bumper assembly 20 is in alignment with the jounce axis JA to ensure that the first and second components 22, 24 do not contact each other. Typically, the energy management jounce bumper assembly 20 is used with the suspension system of the vehicle to limit movement of specific components within the suspension system. In such an example, limiting the jounce between specific components of the suspension system limits the result of the energy management jounce bumper assembly 20 absorbing energy of an impact force experienced by the suspension system, such as when the vehicle travels over a bump. Said differently, the energy management jounce bumper assembly 20 provides a cushion that gradually stiffens the suspension system as the suspension system approaches an end of its maximum jounce travel, i.e., before elements of the suspension system contact the frame member of the vehicle. The energy management jounce bumper assembly 20 also is used to limit the amount of the impact force transferred to components of the suspension system thereby preventing catastrophic failure of components of the suspension system, such as shock tubes, shock towers, and/or the shock mounts. It should be appreciated that the first and second components 22, 24 may be any components of the suspension system and/or the frame of the vehicle.

For example, the second component 24 may be a strut assembly, which comprises a cylinder and a piston rod displaceable relative to the cylinder along the jounce axis JA. Typically, an end of the piston rod is coupled to the first component 22, which in this case is the frame member, for coupling the suspension system to the frame member of the vehicle. In such an embodiment, the energy management jounce bumper assembly 20 is disposed between the frame member and the cylinder. It should be appreciated that the energy management jounce bumper assembly 20 may be disposed between any elements of the vehicle.

Referring to FIG. 1, the energy management jounce bumper assembly 20 may be coupled to the first component 22 and is aligned with the jounce axis JA. As such, if the first component 22 is moveable along the jounce axis JA, the energy management jounce bumper assembly 20 will move with the first component 22. Alternatively, the first component 22 may be stationary with the second component 24 moveable along the jounce axis JA. In such an embodiment, the energy management jounce bumper assembly 20 would remain stationary with the first component 22 as the second component 24 moves along the jounce axis JA.

The energy management jounce bumper assembly 20 includes a bumper 26. The bumper 26 has a generally cylindrical configuration. However, it should be appreciated that the bumper 26 can be of any suitable configuration. A diameter D of the bumper 26 may vary along a length L of the bumper 26. The bumper 26 also has a first end 28 configured to be coupled to the first component 22. Said differently, the first end 28 of the bumper 26 is coupled to the first component 22. It should be appreciated that the first end 28 of the bumper 26 may be directly coupled to the first component 22 or the first end 28 of the bumper 26 may be coupled to the first component 22 by an intervening part, such as a bracket. It should be appreciated that the bumper 26 may be directly connected to the first component 22.

The bumper 26 also has a second end 30 spaced from the first end 28 with the second end 30 configured to contact the second component 24. Said differently, when at least one of the first and second components 22, 24 moves along the jounce axis JA, the second end 30 of the bumper 26 comes into contact with the second component 24. It should be appreciated that the energy management jounce bumper assembly 20 may be coupled to the second component 24 such that the second end 30 of the bumper 26 contacts the first component 22.

Generally, the second component 24 moves toward the first component 22 as the result of a force being applied to the second component 24. The bumper 26 is disposed between the first and second components 22, 24 for limiting jounce of the second component 24 along the jounce axis JA as a result of the force being applied to the second component 24. Said differently, the bumper 26 prevents direct contact between the first and second components 22, 24.

The bumper 26 is axially compressible along the jounce axis JA between the first and second components 22, 24. Said differently, the bumper 26 is axially compressible between the first and second ends 28, 30 of the bumper 26 itself. Generally, the bumper 26 is compressed between the first and second components 22, 24. It should be appreciated that the bumper 26 may not actually contact either the first or second components 22, 24 directly. For example, the second component 24 may include a striker configured to contact the bumper 26 as at least one of the first and second components 22, 24 moves along the jounce axis JA.

As the bumper 26 is compressed, energy that caused at least one of the first and second components 22, 24 to move along the jounce axis JA is absorbed. Said differently, the bumper 26 resists the compression force applied by the movement of the first and second components 22, 24 towards each other and the resistance of the compression force absorbs the energy that placed the first and/or the second components 22, 24 in motion in the first place.

Therefore, the bumper 26 may be a material that is resilient, i.e., material that is able to spring back to shape after being compressed. For example, the material of the bumper 26 may be microcellular urethane, rubber, and combinations thereof.

At times, the energy transferred into the bumper 26 is greater than the bumper 26 can absorb. Once the bumper 26 reaches a maximum compression, the bumper 26 is not able to absorb additional energy. Typically, after the bumper 26 reaches the maximum compression, any remaining energy is transferred into either the first and/or second components 22, 24.

The bumper 26 may define at least one groove 32 for controlling movement of the bumper 26 as the bumper 26 is compressed. The groove 32 may also reduce a stiffness of the bumper 26 at the location of the groove 32 for controlling the compression of the bumper 26. Additionally, the groove 32 may allow the bumper 26 to be compressed along the jounce axis JA. More specifically, the groove 32 allows the bumper 26 to be compressed uniformly along the jounce axis JA. The groove 32 also minimizes lateral expansion of the bumper 26 when the bumper 26 is compressed.

The energy management jounce bumper assembly 20 also includes a plate 34, according to the present invention, connected to the bumper 26 proximate the first end 28 of the bumper 26. The plate 34 may be used to couple the bumper 26 to the first component 22. The plate 34 is designed to absorb additionally energy as the bumper 26 is compressed thereby reducing or even preventing additional energy from being transferred into the first and/or second components 22, 24. Said differently, the plate 34 increases the amount of energy the energy management jounce bumper assembly 20 can absorb without significantly increasing the overall size of the energy management jounce bumper assembly 20.

In one embodiment illustrated in FIGS. 2-5, the plate 34 has a body portion 36. The body portion 36 has a first surface 38 typically facing the first component 22 and a second surface 40 opposite the first surface 38. The plate 34 includes a first plurality of ribs 42 disposed on the first surface 38 and a second plurality of ribs 44 disposed on the second surface 40. Each of the first plurality of ribs 42 are spaced from each other. Likewise, each of the second plurality of ribs 44 is spaced from each other. Additionally, each of the first plurality of ribs 42 is offset along the first surface 38 relative to each of the second plurality of ribs 44 such that each of the first plurality of ribs 42 is staggered relative to each of the second plurality of ribs 44. Said differently, the first plurality of ribs 42 are not aligned with the second plurality of ribs 44 relative to a direction of compression of the bumper 26. Said yet another way, the first surface 38 of the body portion 36 defines a first plane 46 with each of the first plurality of ribs 42 offset along the first plane 46 of the first surface 38 relative to the each of the second plurality of ribs 44. Typically, the first and second plurality of ribs 42, 44 extend along a respective one of the first and second surfaces 38, 40 in similar directions such that the first and second plurality of ribs 42, 44 do not overlap one another relative to the first plane 46 of the first surface 38.

Figure 6:
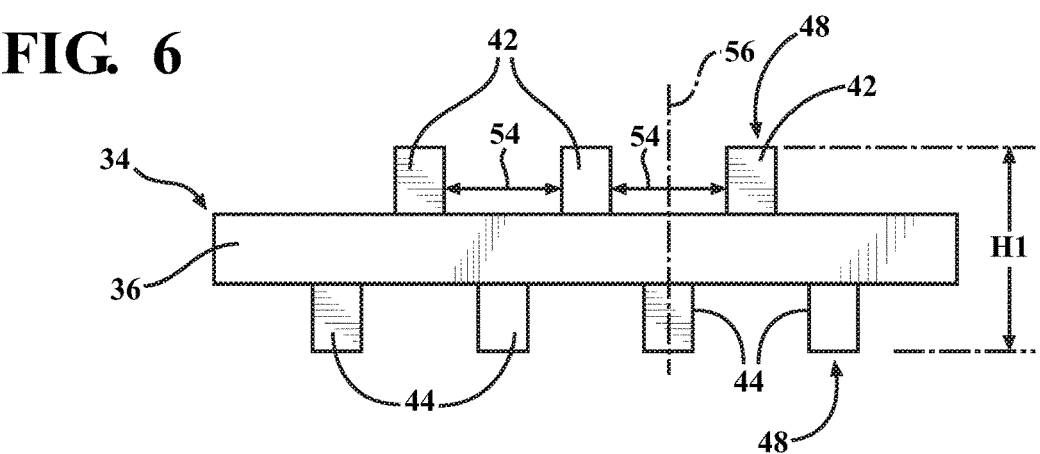
FIG. 6 is a front view of the plate of FIG. 2 in a standard position.

As shown in FIG. 6, the body portion 36 of the plate 34 has a standard position wherein the body portion 36 is planar. In the standard position, the body portion 36 defines a first height H1 between ends of the first and second plurality of ribs 42, 44. Said differently, the first and second plurality of ribs 42, 44 extend from the body portion 36 to a terminal end 48 with the first height H1 defined between the terminal end 48 of the first plurality of ribs 42 to the terminal end 48 of the second plurality of ribs 44.

Figure 7:
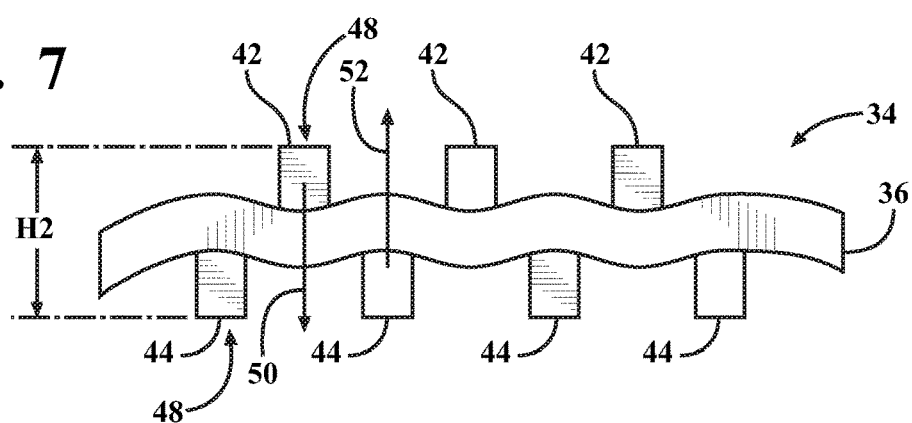
FIG. 7 is a front view of the plate of FIG. 2 in a compressed position.

As shown in FIG. 7, the body portion 36 of the plate 34 also has a compressed position wherein the body portion 36 is non-planar. In the compressed position, the body portion 36 defines a second height H2 between the terminal end 48 of the first plurality of ribs 42 and the terminal end 48 of the second plurality of ribs 44. In the compressed position, the second height H2 is less than the first height H1. Said differently, the first height H1 of the standard position is reduced to the second height H2 as the plate 34 is compressed from the standard position to the compressed position. The plate 34 is adaptable between the standard position and the compressed position. Said differently, the plate 34 is compressible from the standard position to the compressed position.

The plate 34 does not expand radially when the plate 34 is in the compressed position relative to the standard position. Said differently, the plate 34 does not expand radially as the plate 34 is forced from the standard position to the compressed position.

Additionally, as the plate 34 moves from the standard position to the compressed position, the first plurality of ribs 42 are movable in a first direction 50 toward the second plurality of ribs 44. Similarly, the second plurality of ribs 44 may be moveable in a second direction 52 opposite the first direction 50 and towards the first plurality of ribs 42 as the body portion 36 moves from the standard position toward the compressed position. The movement of the first plurality of ribs 42 and/or the second plurality of ribs 44 forces the body portion 36 from the planar configuration to the compressed configuration. Specifically, because the first and second plurality of ribs 42, 44 is staggered relative to each other, the non-planar configuration of the body portion 36 in the compressed position resembles a wave. For example, the non-planar configuration could also be referred to as a sinusoidal configuration as shown in FIG. 7.

It is to be appreciated that the plate 34 is movable from the standard position to the compressed position and then back to the standard position. Said differently, the plate 34 is not permanently deformed as the plate 34 is compressed from the standard position to the compressed position. Instead, once the force is removed from the plate 34 in the compressed position, the plate 34 returns to the standard position.

As shown in FIGS. 6 and 7, in one embodiment, the plate 34 includes a gap 54 defined between two of the first plurality of ribs 42 with the gap 54 having a centerline 56 disposed equidistant between the two of the first plurality of ribs 42 with one of the second plurality of ribs 44 aligned with the centerline 56 of the gap 54. In such an embodiment, the one of the second plurality of ribs 44 is moveable along the centerline 56 as the body portion 36 moves from the standard position towards the compressed position.

Figure 3:
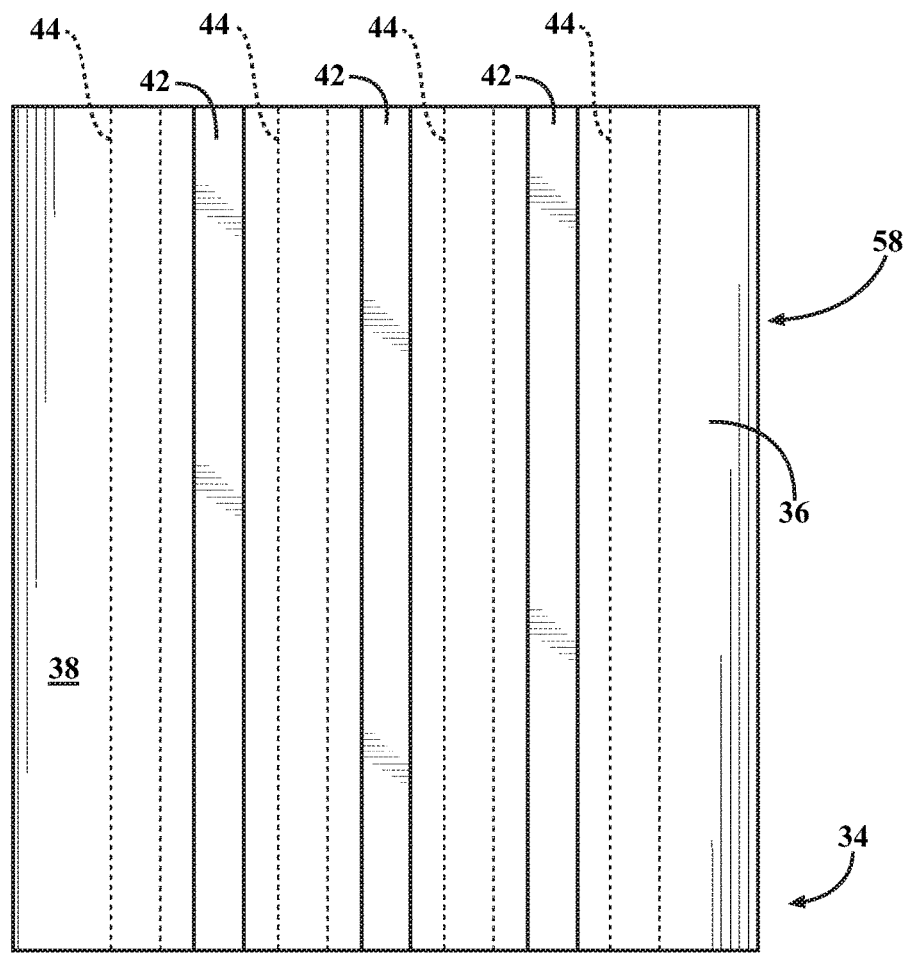
FIG. 3 is a top view of the plate of FIG. 2 having a rectangular configuration.
Figure 4:
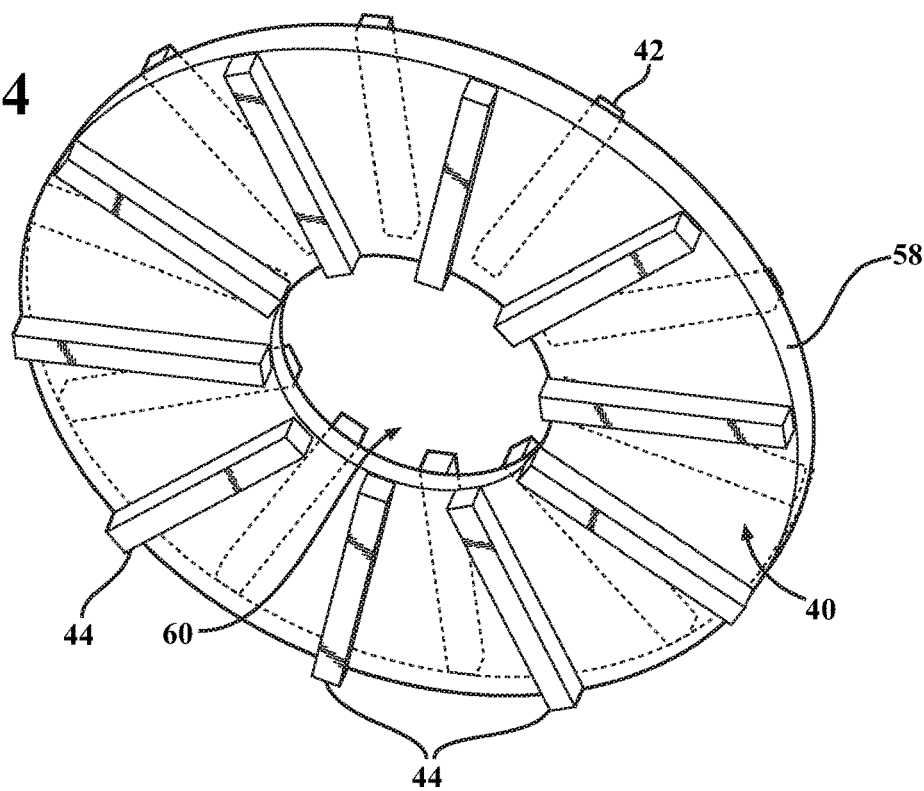
FIG. 4 is a perspective view of the plate of FIG. 2 having a circular configuration.
Figure 5:
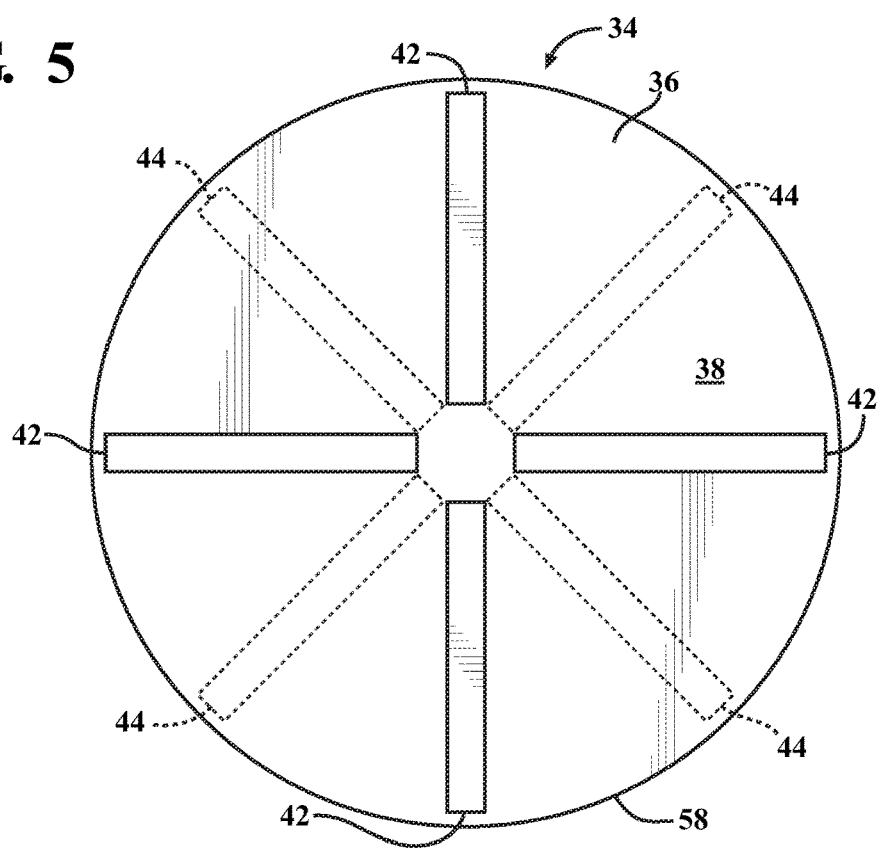
FIG. 5 is a top view of the plate of FIG. 2 having the circular configuration.

As illustrated in FIGS. 3-5, the body portion 36 of the plate 34 has an outer perimeter 58. It should be appreciated that the first and second plurality of ribs 42, 44 may extend to or be spaced from the outer perimeter 58. In at least one embodiment, the outer perimeter 58 of the plate 34 has a circular configuration, as illustrated in FIGS. 4 and 5. In such an embodiment, each of the first plurality of ribs 42 extend in a radial direction along the first surface 38 toward the outer perimeter 58 and each of the second plurality of ribs 44 extend in a radial direction along the second surface 40 toward the outer perimeter 58. As such, the plate 34 may be further defined as a disc having the circular outer perimeter 58. When the plate 34 is the disc, the first plurality of ribs 42 and the second plurality of ribs 44 extend from the circular outer perimeter 58 of the disc toward a circular inner perimeter. It should be appreciated that although the first plurality of ribs 42 extends from the circular outer perimeter 58, the first plurality of ribs 42 may be spaced from the circular outer perimeter 58. In another embodiment, the first and/or second plurality of ribs 44 may be flush with the circular outer perimeter 58 and the circular inner perimeter with respect to the jounce axis JA.

As illustrated in FIG. 4, the body portion 36 may define a central hole 60 spaced from the outer perimeter 58 with the first and second plurality of ribs 42, 44 extending between the outer perimeter 58 and the central hole 60. The central hole 60 can be used to modify a stiffness of the plate 34, thereby adjusting the amount of energy the plate 34 absorbs as the plate 34 is compressed from the standard position to the compressed position. The central hole 60 can also be used to aid in attachment or mounting of the plate 34 to the first and/or second components 22, 24.

Figure 8:
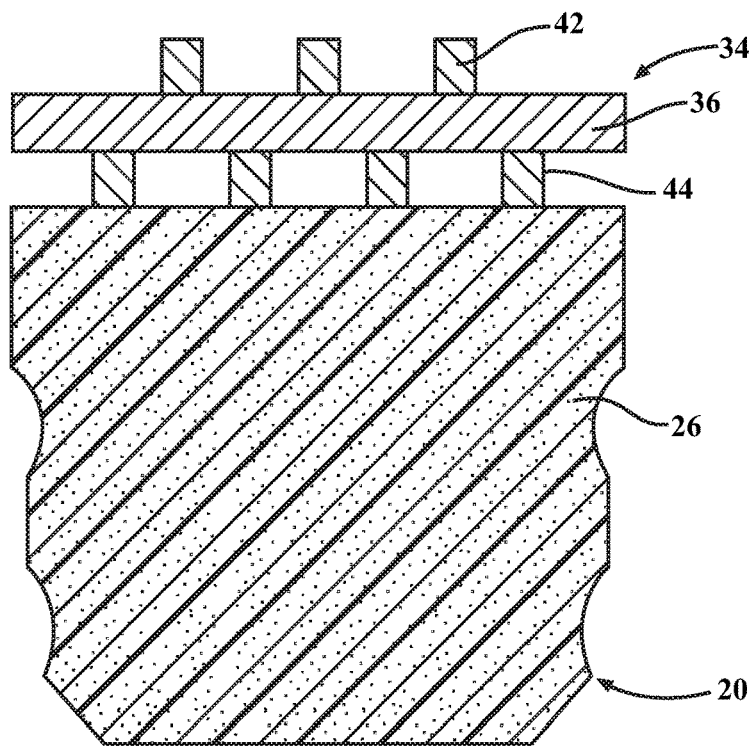
FIG. 8 is a cross-sectional view of the energy management jounce bumper assembly and the plate of FIGS. 1 and 2 coupled to a first end of a bumper.
Figure 9:
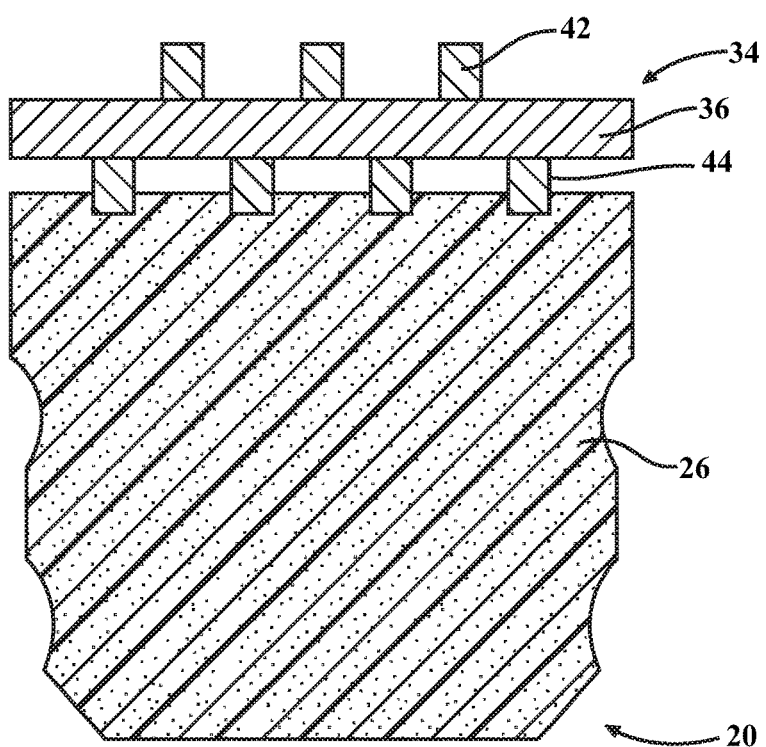
FIG. 9 is a cross-sectional view of the energy management jounce bumper assembly with the plate partially embedded within the bumper.
Figure 10:
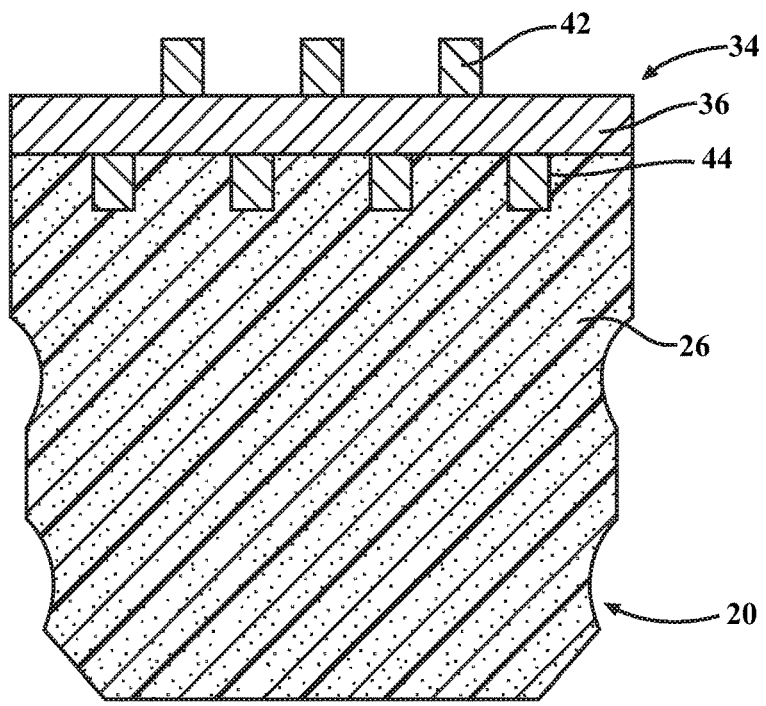
FIG. 10 is a cross-sectional view of the energy management jounce bumper assembly and the plate of FIGS. 1 and 2 partially embedded within the bumper.
Figure 11:
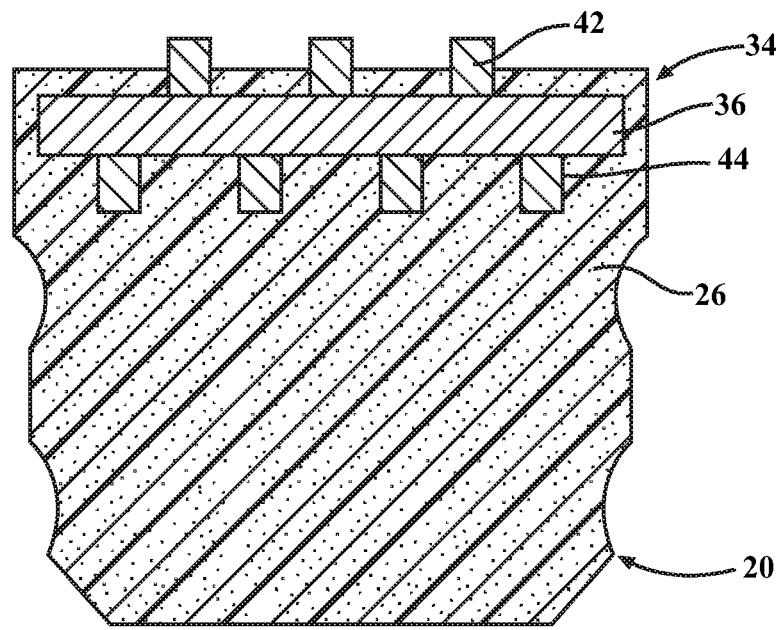
FIG. 11 is a cross-sectional view of the energy management jounce bumper assembly and the plate of FIGS. 1 and 2 partially embedded within the bumper.
Figure 12:
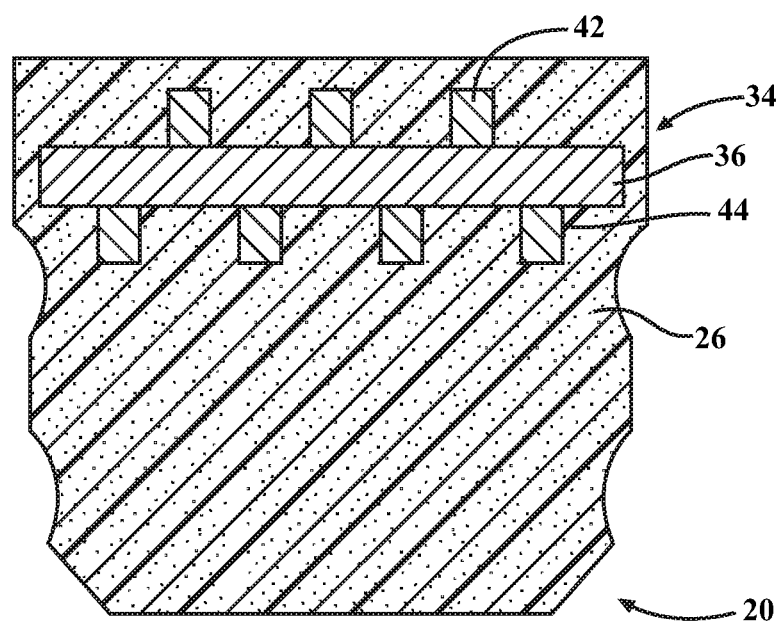
FIG. 12 is a cross-sectional view of the energy management jounce bumper assembly and the plate of FIGS. 1 and 2 completely embedded within the bumper.

It should be appreciated that the plate 34 may be connected to the bumper 26 via either the first or second plurality of ribs 42, 44. For example, as illustrated in FIG. 8, the first plurality of ribs 42 may be directly connected to the bumper 26. As illustrated in FIG. 9, the first plurality of ribs 42 may be at least partially embedded within the bumper 26. As illustrated in FIG. 10, the first plurality of ribs 42 and at least a portion of the body portion 36 of the plate 34 may be embedded within the bumper 26. As illustrated in FIG. 11, the first plurality of ribs 42, the body portion 36, and at least a portion of the second plurality of ribs 44 may be embedded within the bumper 26. As illustrated in FIG. 12, the plate 34 may be embedded within the bumper 26. Said differently, the plate 34 may be completely disposed within the bumper 26.

The plate 34 is typically made of a polymeric material. For example, the plate 34 may be a thermoplastic elastomer. More specifically, the plate 34 may be a material selected from a group including elastomeric material, thermoplastic polyurethane, elastomeric blend material, and combinations thereof. Even more specifically, the material of the plate 34 may be selected from a group of elastomeric PVC blends and alloys, styrenic block copolymers, thermoplastic polyurethane, polyether block amids, thermoplastic olefins, dynamically vulcanized alloys, copolyester elastomers, and combinations thereof. As such, the plate 34 may be overmolded to the bumper 26, thereby coupling the plate 34 to the bumper 26. In another embodiment, the plate 34 may be produced separately from the bumper 26 and subsequently attached to the bumper 26.

The bumper 26 has a first stiffness and the plate 34 has a second stiffness that may be greater than the first stiffness such that the bumper 26 is axially compressible to a predetermined value before the plate 34 moves from the standard position to the compressed position. For example, the bumper 26 initially compresses to absorb some, if not all, the energy. If the bumper 26 cannot absorb all the energy, the plate 34 is then compressed. In another embodiment, as the bumper 26 receives the impact force, both the bumper 26 and the plate 34 may be compressed, such that both the bumper 26 and the plate 34 are simultaneously absorbing energy.

Figure 13:
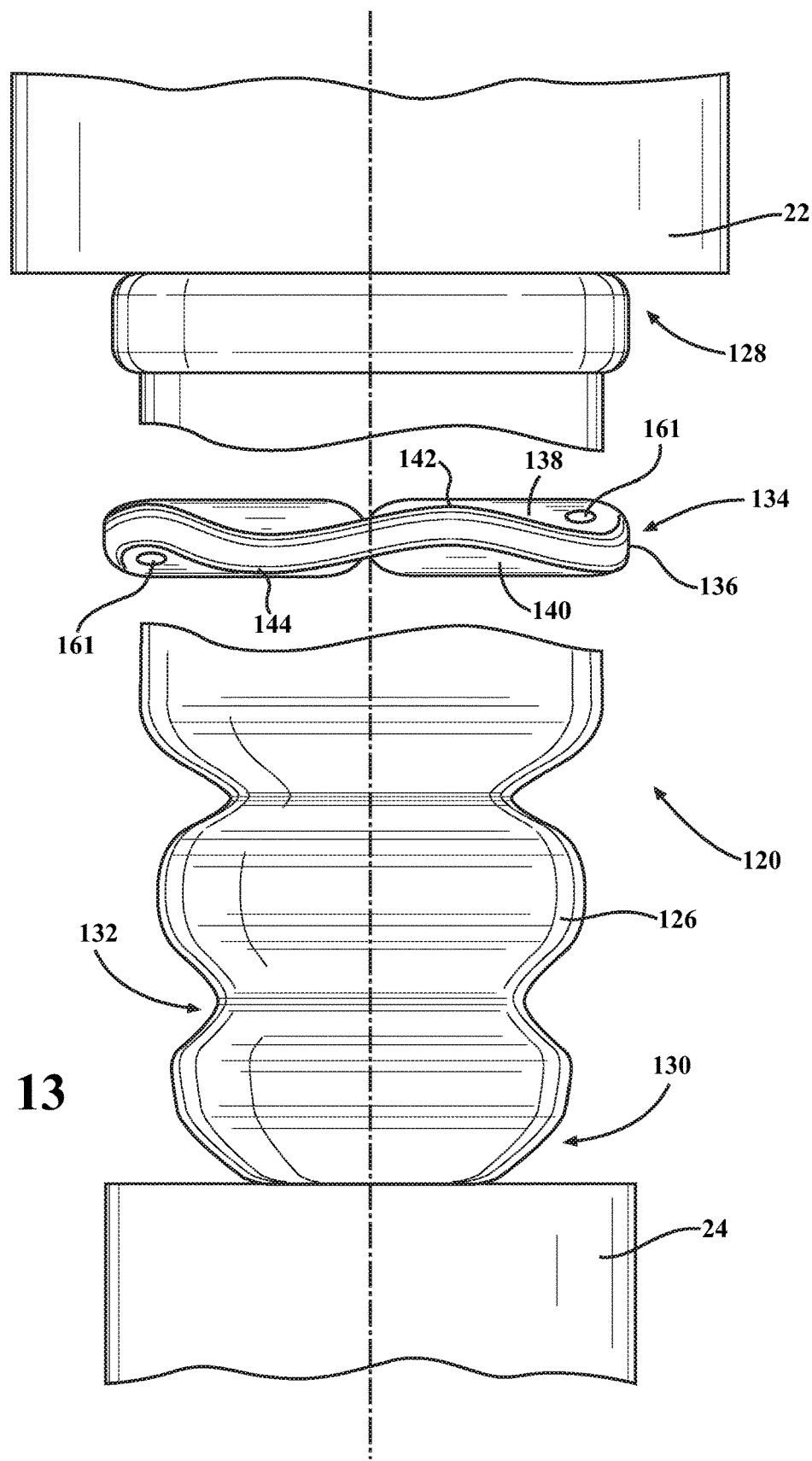
FIG. 13 is an exploded front view of another embodiment of an energy management jounce bumper assembly, according to the present invention, disposed between a first component and a second component.
Figure 14:
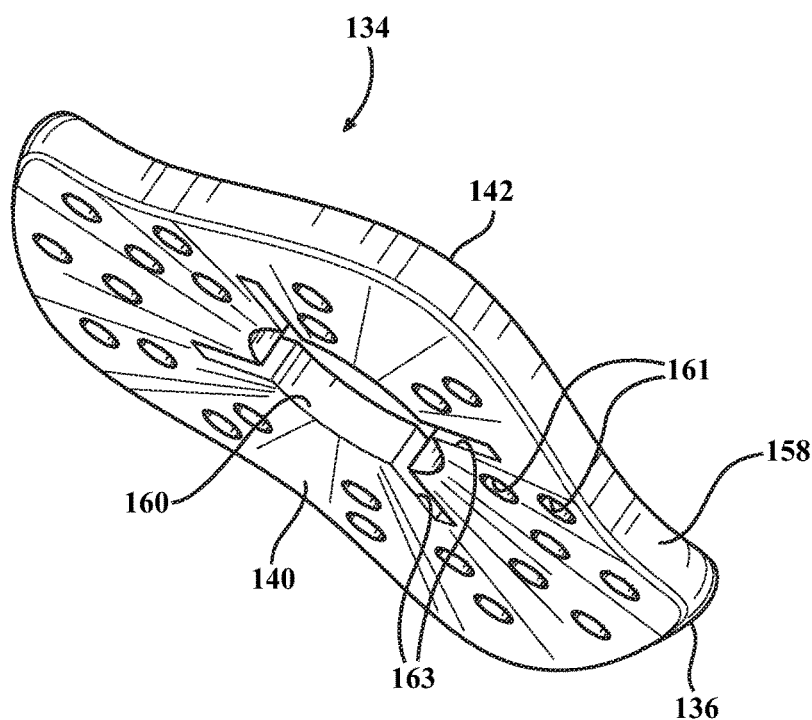
FIG. 14 is a perspective view of another embodiment of a plate, according to the present invention, used in the jounce bumper assembly of FIG. 13.
Figure 15:
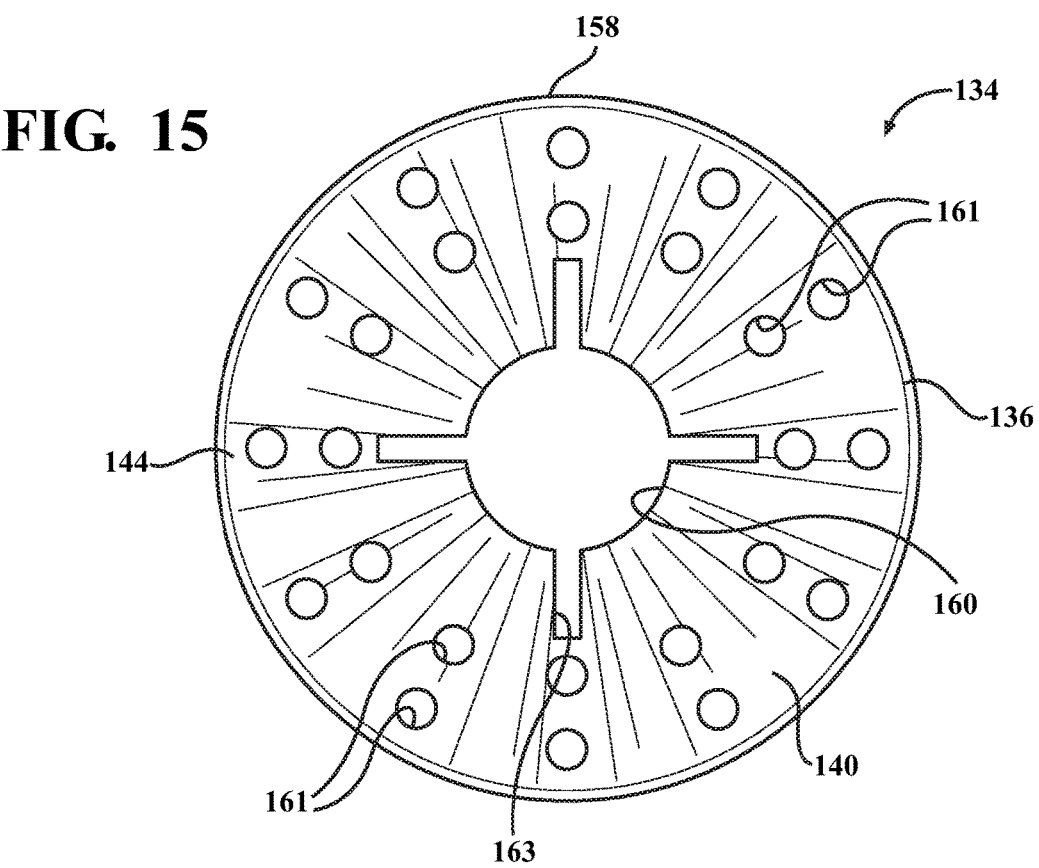
FIG. 15 is a front view of the plate of FIGS. 13 and 14 having a circular configuration.

Referring to FIGS. 13 through 15, another embodiment, according to the present invention, of the energy management jounce bumper assembly 20 is shown. Like parts of the energy management jounce bumper assembly 20 have like reference numerals increased by one hundred (100). In this embodiment, the energy management jounce bumper assembly 120 includes a bumper 126. The bumper 126 has a generally cylindrical configuration. However, it should be appreciated that the bumper 126 can be of any suitable configuration. The bumper 126 also has a first end 128 configured to be coupled to the first component 22. The bumper 126 also has a second end 130 spaced from the first end 128 with the second end 130 configured to contact the second component 24. The bumper 126 may define at least one groove 132 for controlling movement of the bumper 126 as the bumper 126 is compressed. The groove 132 may also reduce a stiffness of the bumper 126 at the location of the groove 132 for controlling the compression of the bumper 126. The groove 132 also minimizes lateral expansion of the bumper 126 when the bumper 126 is compressed.

The energy management jounce bumper assembly 120 also includes a plate 134, according to another embodiment of the present invention, connected to the bumper 126. In this embodiment, the plate 134 has a body portion 136. The body portion 136 has a first surface 138 typically facing the first component 22 and a second surface 140 opposite the first surface 138 typically facing the second component 24. The plate 134 includes a first plurality of ribs or waves 142 formed by the first surface 138 and a second plurality of ribs or waves 144 formed by the second surface 140. Each of the first plurality of waves 142 is spaced from each other. Likewise, each of the second plurality of waves 144 is spaced from each other. Additionally, each of the first plurality of waves 142 is offset along the first surface 138 relative to each of the second plurality of waves 44 such that each of the first plurality of waves 142 is staggered or alternated relative to each of the second plurality of waves 144. Said differently, the first plurality of waves 142 are not aligned with the second plurality of waves 144 relative to a direction of compression of the bumper 126. Typically, the first and second plurality of waves 142, 144 extend along a respective one of the first and second surfaces 138, 140 in similar directions such that the first and second plurality of waves 142, 144 do not overlap one another.

Figure 16:
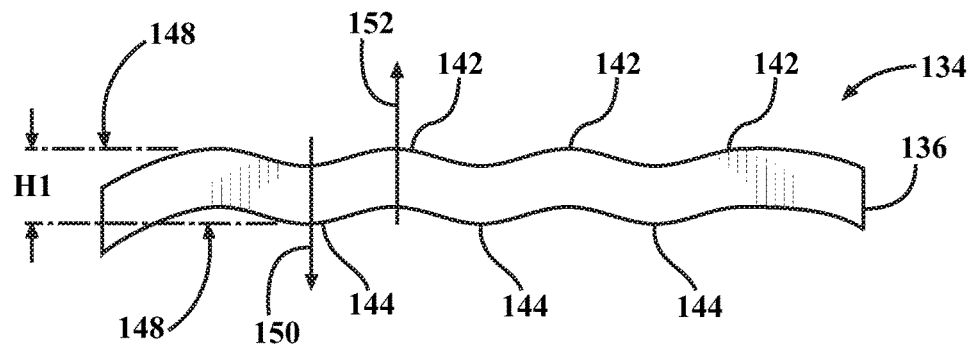
FIG. 16 is a front view of the plate of FIGS. 13 and 14 in a standard position.

As shown in FIG. 16, the body portion 136 of the plate 134 has a standard position wherein the body portion 136 is non-planar. In the standard position, the body portion 136 defines a first height H1 between ends of the first and second plurality of waves 142, 144. Said differently, the first and second plurality of waves 142, 144 extend from the body portion 136 to a terminal end 148 with the first height H1 defined between the terminal end 148 of the first plurality of waves 142 to the terminal end 148 of the second plurality of waves 144.

Figure 17:
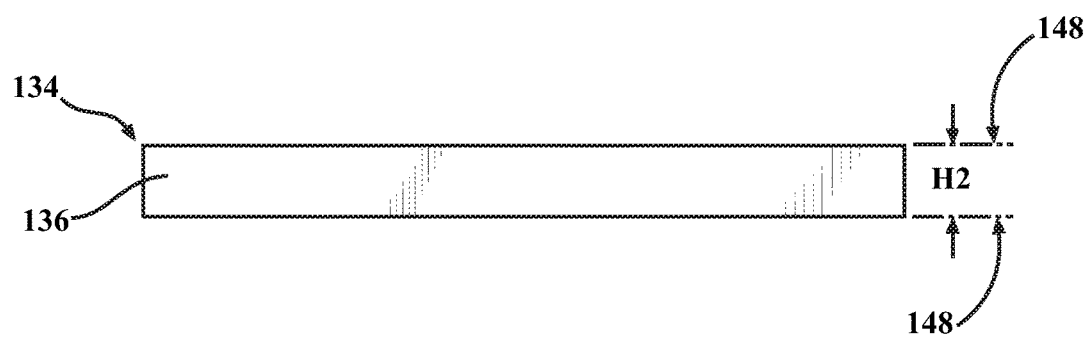
FIG. 17 is a front view of the plate of FIGS. 13 and 14 in a compressed position.

As shown in FIG. 17, the body portion 136 of the plate 134 also has a compressed position wherein the body portion 136 is planar. In the compressed position, the body portion 136 defines a second height H2 between the terminal end 148 of the first plurality of ribs 142 and the terminal end 148 of the second plurality of ribs 144. In the compressed position, the second height H2 is less than the first height H1. Said differently, the first height H1 of the standard position is reduced to the second height H2 as the plate 134 is compressed from the standard position to the compressed position. The plate 134 is adaptable between the standard position and the compressed position. Said differently, the plate 134 is compressible from the standard position to the compressed position.

The plate 134 does not expand radially when the plate 134 is in the compressed position relative to the standard position. Said differently, the plate 134 does not expand radially as the plate 134 is forced from the standard position to the compressed position.

Additionally, as the plate 134 moves from the standard position to the compressed position, the first plurality of waves 142 are movable in a first direction 150 toward the second plurality of waves 144. Similarly, the second plurality of waves 144 may be moveable in a second direction 152 opposite the first direction 150 and towards the first plurality of waves 142 as the body portion 136 moves from the standard position toward the compressed position. The movement of the first plurality of waves 142 and/or the second plurality of waves 144 forces the body portion 136 from the standard non-planar configuration to the compressed planar configuration. Specifically, because the first and second plurality of waves 142, 144 is staggered relative to each other, the non-planar configuration of the body portion 136 in the standard position resembles a wave. For example, the non-planar configuration could also be referred to as a sinusoidal configuration as shown in FIG. 13. It should be appreciated that the planar configuration of the body portion 136 in the compressed position could also be referred to as a flat or linear configuration.

It should be appreciated that the plate 134 is movable from the standard position to the compressed position and then back to the standard position. Said differently, the plate 134 is not permanently deformed as the plate 134 is compressed from the standard position to the compressed position. Instead, once the force is removed from the plate 134 in the compressed position, the plate 134 returns to the standard position.

As illustrated in FIGS. 13-15, the body portion 136 of the plate 134 has an outer perimeter 158. It should be appreciated that the first and second plurality of waves 142, 144 may extend to or be spaced from the outer perimeter 158. In at least one embodiment, the outer perimeter 158 of the plate 134 has a circular configuration, as shown in FIGS. 14 and 15. In such an embodiment, each of the first plurality of waves 142 extend in a radial direction along the first surface 138 toward the outer perimeter 158 and each of the second plurality of waves 144 extend in a radial direction along the second surface 140 toward the outer perimeter 158. As such, the plate 134 may be further defined as a disc having the circular outer perimeter 158. When the plate 134 is the disc, the first plurality of waves 142 and the second plurality of waves 144 extend from the circular outer perimeter 158 of the disc toward a circular inner perimeter. It should be appreciated that although the first plurality of waves 142 extends from the circular outer perimeter 158, the first plurality of waves 142 may be spaced from the circular outer perimeter 158. In another embodiment, the first and/or second plurality of waves 144 may be flush with the circular outer perimeter 158 and the circular inner perimeter with respect to the jounce axis JA.

As illustrated in FIGS. 14 and 15, the body portion 136 may include a primary or central aperture or hole 160 spaced from the outer perimeter 158 with the first and second plurality of waves 142, 144 extending between the outer perimeter 158 and the central hole 160. The central hole 160 can be used to modify a stiffness of the plate 134, thereby adjusting the amount of energy the plate 134 absorbs as the plate 134 is compressed from the standard position to the compressed position. The central hole 160 can also be used to aid in attachment or mounting of the plate 134 to the first and/or second components 22, 24. The body portion 136 may include a plurality of secondary apertures or holes 161 spaced from the central hole 160 and from each other. The secondary holes 161 are generally circular in shape, but may be any suitable shape. As illustrated, the secondary holes 161 extend along a radial from a center of the central hole 160 and through the first and second plurality of waves 142, 144. The body portion 136 may further include a plurality of slots 163 extending radially from and spaced circumferentially about the central hole 160. The slots 163 are generally rectangular in shape, but may be any suitable shape. As illustrated, a pair of secondary holes 161 is spaced between an end of each of the slots 163 and the outer perimeter 158. As illustrated in FIG. 13, the plate 134 may be embedded within the bumper 126. Said differently, the plate 134 may be completely disposed within the bumper 126. It should be appreciated that the secondary holes 161 and slots 163 allow for axial compression without radial expansion of the plate 134 from the standard position to the compressed position. It should be appreciated that the plate 134 may be connected to the bumper 126 via either the first or second plurality of waves 142, 144.

The plate 134 is typically made of a polymeric material. For example, the plate 134 may be a thermoplastic elastomer. More specifically, the plate 134 may be a material selected from a group including elastomeric material, thermoplastic polyurethane, elastomeric blend material, and combinations thereof. Even more specifically, the material of the plate 134 may be selected from a group of elastomeric PVC blends and alloys, styrenic block copolymers, thermoplastic polyurethane, polyether block amids, thermoplastic olefins, dynamically vulcanized alloys, copolyester elastomers, and combinations thereof. As such, the plate 134 may be overmolded to the bumper 126, thereby coupling the plate 134 to the bumper 126. In another embodiment, the plate 134 may be produced separately from the bumper 126 and subsequently attached to the bumper 126.

The bumper 126 has a first stiffness and the plate 134 has a second stiffness that may be greater than the first stiffness such that the bumper 126 is axially compressible to a predetermined value before the plate 134 moves from the standard position to the compressed position. For example, the bumper 126 initially compresses to absorb some, if not all, the energy. If the bumper 126 cannot absorb all the energy, the plate 134 is then compressed. In another embodiment, as the bumper 126 receives the impact force, both the bumper 126 and the plate 134 may be compressed, such that both the bumper 126 and the plate 134 are simultaneously absorbing energy. It should be appreciated that the operation of the plate 134 is similar to the plate 34.

The present invention has been described in an illustrative manner. It is to be understood that the terminology which has been used is intended to be in the nature of words of description rather than of limitation. Many modifications and variations of the present invention are possible in light of the above teachings, and the present invention may be practiced otherwise than as specifically described.

What is claimed is:

1. An energy management jounce bumper assembly adapted to absorb energy from a first component and a second component of a suspension system of a vehicle, said energy management jounce bumper assembly comprising:
    a bumper having a first end configured to be coupled to the first component, with said bumper also having a second end spaced from said first end with said second end configured to contact the second component, wherein said bumper is configured to be axially compressible along the jounce axis between the first and second components;
    a plate connected to said bumper proximate said first end of said bumper, wherein said plate has a body portion having a first surface configured to face the first component and a second surface opposite said first surface, with said plate including a first plurality of ribs disposed on said first surface and a second plurality of ribs disposed on said second surface; and
    wherein said body portion of said plate is adaptable between a standard position, wherein said body portion is either one of a planar shape and non-planar shape and has a first height defined between ends of said first and second plurality of ribs, and a compressed position, wherein said body portion is either one of non-planar and planar, respectively, and has a second height defined between said ends of said first and second plurality of ribs, wherein said second height is less than said first height, and
    wherein said body portion of said plate has an outer perimeter and said body portion defines a central hole spaced from said outer perimeter with said first and second plurality of ribs extending between said outer perimeter and said central hole.

2. An energy management jounce bumper assembly as set forth in claim 1 wherein said first plurality of ribs is movable in a first direction toward said second plurality of ribs as said body portion moves from said standard position to said compressed position.

3. An energy management jounce bumper assembly as set forth in claim 1 wherein said second plurality of ribs is moveable in a second direction opposition said first direction and towards said first plurality of ribs as said body portion moves from said standard position toward said compressed position.

4. An energy management jounce bumper assembly as set forth in claim 1 wherein said body portion of said plate has a plurality of secondary holes spaced between said central hole and said outer perimeter.

5. An energy management jounce bumper assembly as set forth in claim 1 wherein said body portion of said plate has a plurality of slots extending radially from and spaced circumferentially about said central hole.

6. An energy management jounce bumper assembly as set forth in claim 1 wherein each of said first plurality of ribs extend in a radial direction along said first surface and each of said second plurality of ribs extend in a radial direction along said second surface.

7. An energy management jounce bumper assembly as set forth in claim 1 wherein said first plurality of ribs is at least partially embedded within said bumper.

8. An energy management jounce bumper assembly as set forth in claim 1 wherein said first plurality of ribs and at least a portion of said body portion of said plate are embedded within said bumper.

9. An energy management jounce bumper assembly as set forth in claim 1 wherein said first plurality of ribs, said body portion and at least a portion of said second plurality of ribs are embedded within said bumper.

10. An energy management jounce bumper assembly as set forth in claim 1 wherein said plate is embedded within said bumper.

11. An energy management jounce bumper assembly as set forth in claim 1 wherein said bumper has a first stiffness and said plate has a second stiffness greater than said first stiffness such that said bumper is axially compressible to a predetermined value before said plate moves from the standard position to the compressed position.

12. An energy management jounce bumper assembly as set forth in claim 1 wherein said bumper comprises microcellular urethane.

13. An energy management jounce bumper assembly as set forth in claim 12 wherein said first plurality of ribs and said second plurality of ribs extend from said circular outer perimeter of said disc toward a circular inner perimeter.

14. An energy management jounce bumper assembly as set forth in claim 1 wherein said plate comprises a material selected from the group comprising elastomeric material, thermoplastic polyurethane, elastomeric blend material, and combinations thereof.

15. An energy management jounce bumper assembly as set forth in claim 14 wherein said first and second plurality of ribs are flush with said circular outer perimeter and said circular inner perimeter with respect to the jounce axis.

16. An energy management jounce bumper assembly as set forth in claim 1 wherein said plate is further defined as a disc having a circular outer perimeter.

17. An energy management jounce bumper assembly as set forth in claim 1 wherein said plate further comprises a gap defined between two of said first plurality of ribs with said gap having a centerline disposed equidistant between said two of said plurality of ribs with one of said second plurality of ribs aligned with said centerline of said gap.

18. An energy management jounce bumper assembly as set forth in claim 17 wherein said one of said plurality of ribs is moveable along said centerline as said body portion moves from said standard position towards said compressed position.

19. A suspension system of a vehicle comprising:
a first component;
a second component spaced from said first component with at least one of said first and second components moveable towards the other component along a jounce axis; and
an energy management jounce bumper assembly adapted to absorb energy from said first and second components with said energy management jounce bumper assembly coupled to said first component and aligned with said jounce axis, said energy management jounce bumper assembly comprising;
a bumper having a first end configured to be coupled to said first component, with said bumper also having a second end spaced from said first end with said second end configured to contact said second component, wherein said bumper is axially compressible along said jounce axis between said first and second components,
a plate connected to said bumper proximate said first end of said bumper, wherein said plate has a body portion having a first surface facing said first component and a second surface opposite said first surface, with said plate including a first plurality of ribs disposed on said first surface and a second plurality of ribs disposed on said second surface, and
wherein said body portion of said plate is adaptable between a standard position, wherein said body portion is either one of planar and non-planar and has a first height defined between ends of said first and second plurality of ribs, and a compressed position, wherein said body portion is either one of non-planar and planar, respectively, and has a second height defined between said ends of said first and second plurality of ribs, wherein said second height is less than said first height, and
wherein said body portion of said plate has an outer perimeter and said body portion defines a central hole spaced from said outer perimeter with said first and second plurality of ribs extending between said outer perimeter and said central hole.

20. A suspension system as set forth in claim 19 wherein said first plurality of ribs is movable in a first direction toward said second plurality of ribs as said body portion moves from said standard position to said compressed position.

21. A suspension system as set forth in claim 19 wherein said second plurality of ribs is moveable in a second direction opposition said first direction and towards said first plurality of ribs as said body portion moves from said standard position toward said compressed position.

* * * * *